Sept. 1, 1953  J. L. METCALFE ET AL  2,650,391
WEIGHING SCALE
Filed June 13, 1947  5 Sheets-Sheet 1
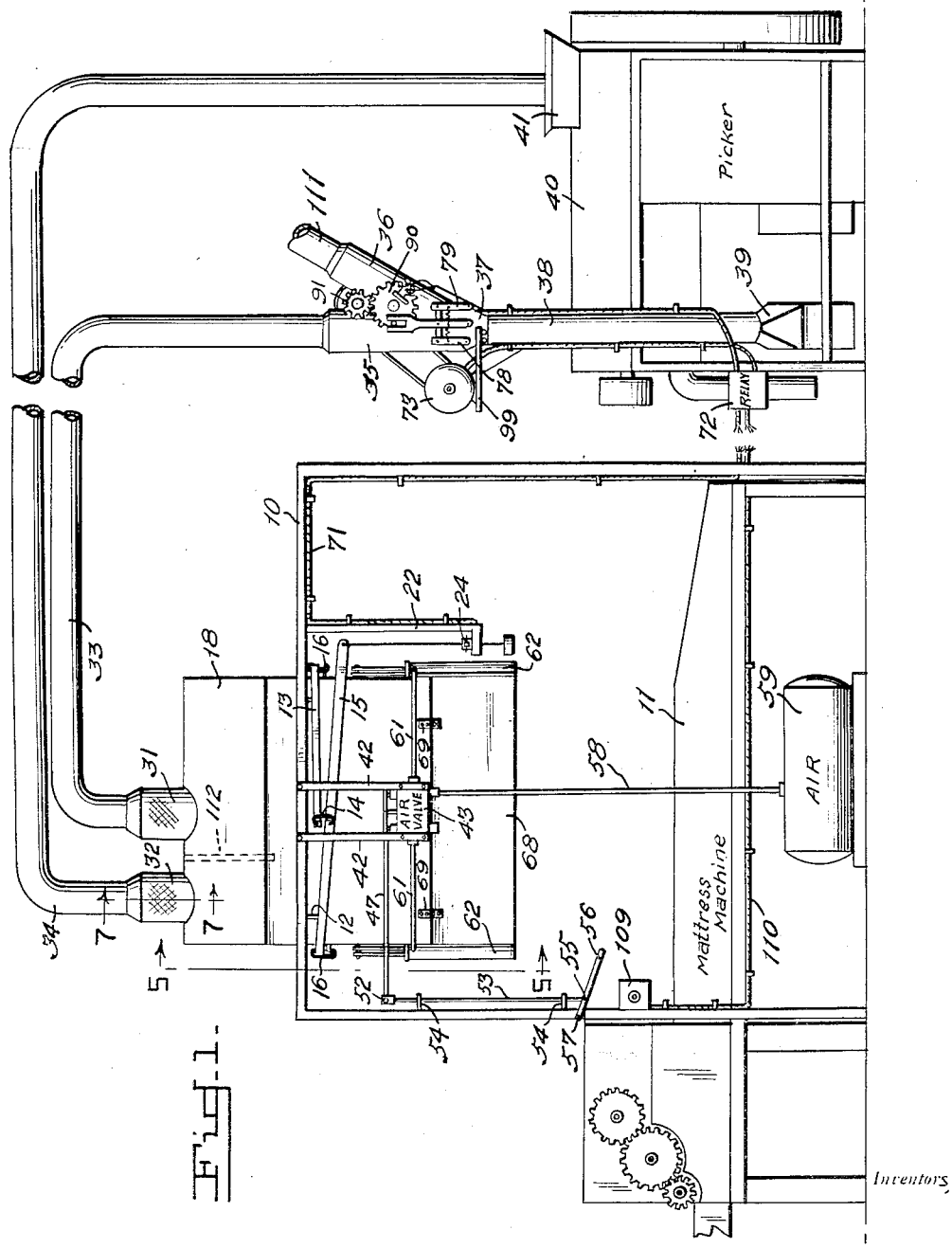
Inventors,
Thomas O. Metcalfe
Jack L. Metcalfe
By Randolph & Beavers
Attorneys Sept. 1, 1953  J. L. METCALFE ET AL  2,650,391
WEIGHING SCALE
Filed June 13, 1947  5 Sheets-Sheet 2
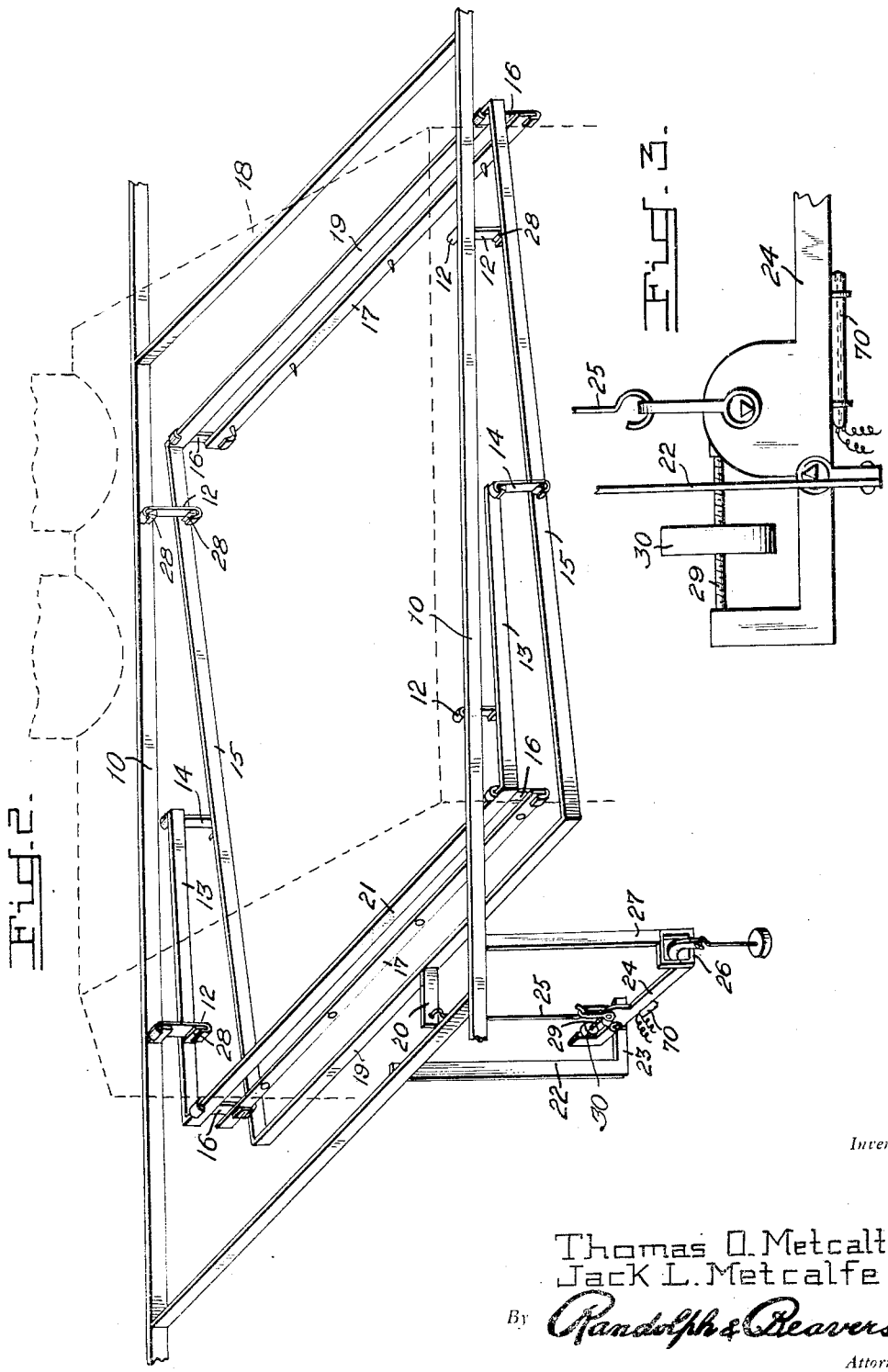
Inventors
Thomas O. Metcalfe
Jack L. Metcalfe
By Randolph & Beavers
Attorneys

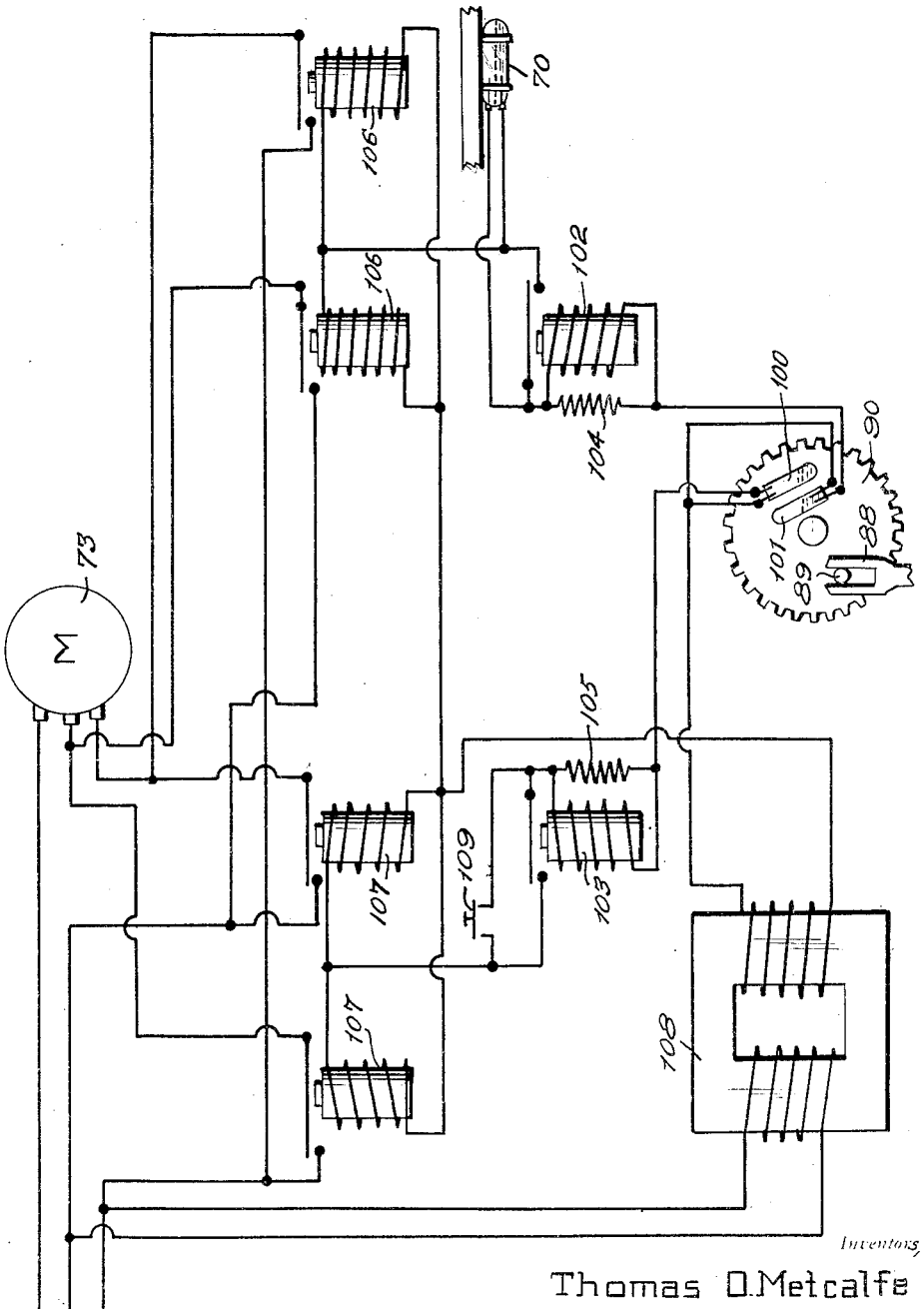

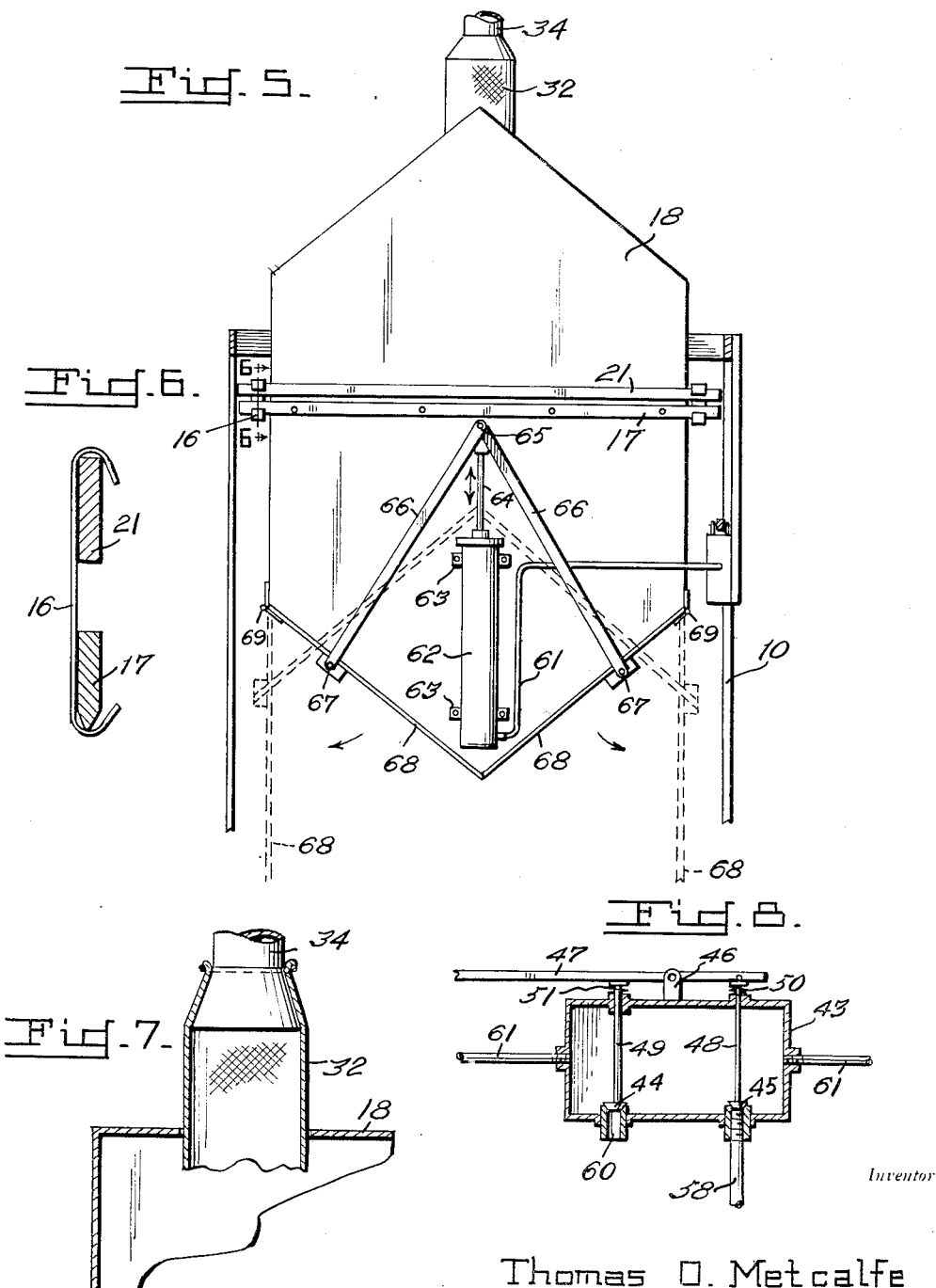

Sept. 1, 1953 J. L. METCALFE, ET AL 2,650,391
WEIGHING SCALE
Filed June 13, 1947 5 Sheets-Sheet 5
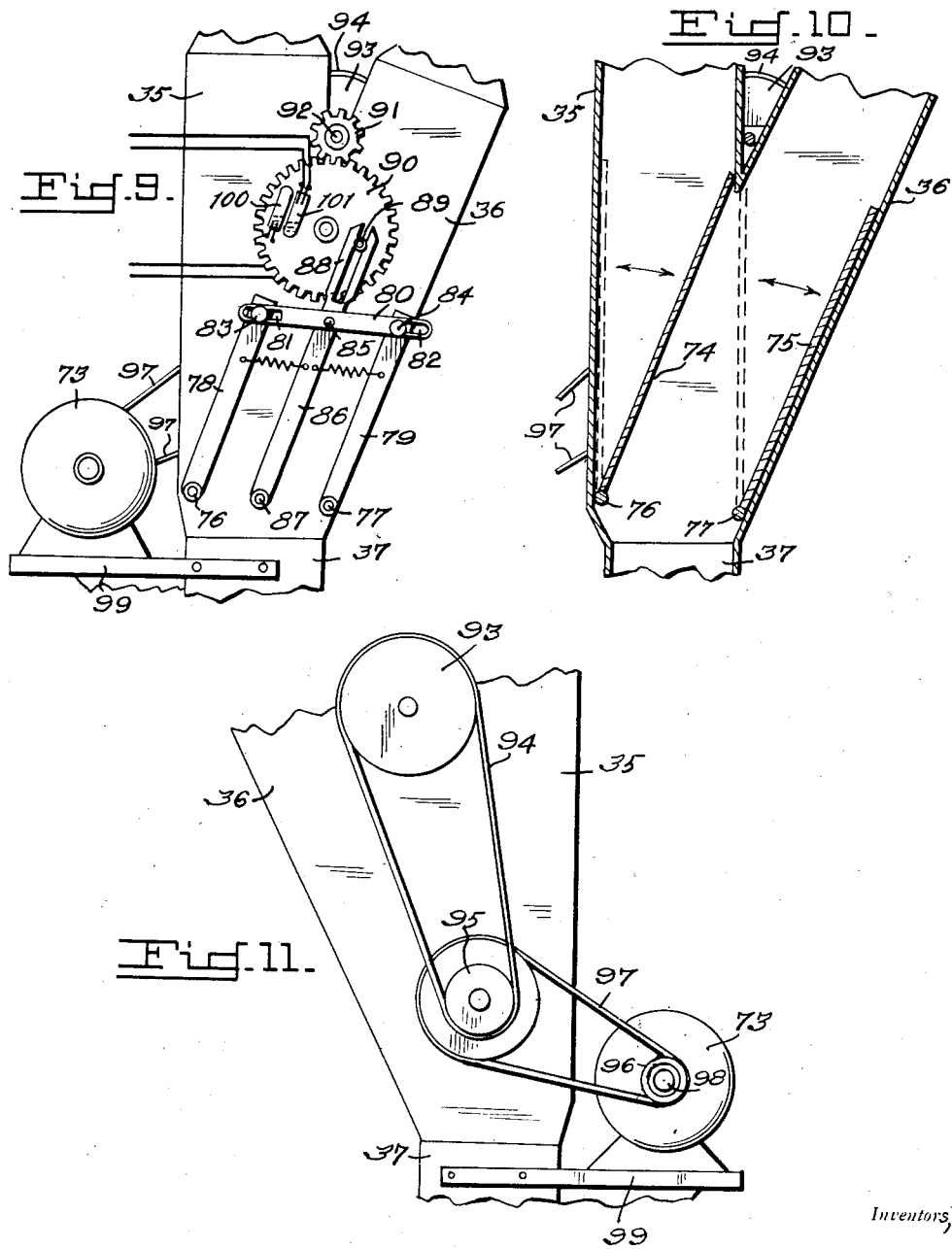
Inventors
Thomas O. Metcalfe
Jack L. Metcalfe
By Randolph & Beavers
Attorneys Patented Sept. 1, 1953

2,650,391

UNITED STATES PATENT OFFICE 2,650,391

WEIGHING SCALE

Jack L. Metcalfe and Thomas O. Metcalfe,
Bluefield, Va.

Application June 13, 1947, Serial No. 754,408

1 Claim. (Cl. 19—69)

The present invention relates to weighing scale and it consists in the combinations, constructions and arrangements of parts herein described and claimed.

Generally, the invention comprises an apparatus particularly useful for weighing with exactness solid matter such as cotton fed thereto by air pressure or like fluid. In the form of the invention as shown and described herein the device is illustrated in connection with a mattress machine. The weighing scale, in this form of the invention, comprises a hopper which is suspended through suitable linkage and levers from a framework overlying the mattress assembly table. A feed line and a return line are connected to the upper end of the hopper by means of extremely flexible cloth connections. A pair of doors is mounted at the lower end of the hopper and is adapted to be opened and closed by means of a pair of pressure operated devices. A valve is provided for regulating the pressure supplied to such devices and is connected through suitable linkage to a lever mounted upon the frame of the machine. The balance arm of the scale is provided with a switch, preferably of the mercury type, which operates through suitable relays to regulate the position of gateways mounted in the supply line to the hopper and provision is made whereby the gates must be fully opened or fully closed before a change in their position may take place. The latter provision is made in order to prevent "fluttering" of the gates.

It is an object of the invention to provide a simple, inexpensive and efficient weighing scale for fluid suspended solids.

A further object of the invention is the provision of novel means for controlling the supply of fluid suspended material to a weighing scale.

A further object of the invention is the provision of novel means for controlling the filling and emptying of a hopper.

Another object of the invention is the provision of a novel system of electrical relays for controlling a motor utilized in the invention.

A further object of the invention is the provision of a novel gateway arrangement for controlling the flow of a fluid.

Another object of the invention is the provision of novel suspension means for a weighing scale.

Other and further objects of the invention will become apparent from a reading of the following specification taken in conjunction with the drawings, in which:

Figure 1 is an elevational view of an embodiment of the invention,

Figure 2 is a perspective view of certain elements of the invention,

Figure 3 is a fragmentary elevational view showing certain details of the invention, Figure 4 is a schematic view illustrating an electrical system utilized in the invention, Figure 5 is an enlarged elevational view taken along line 5—5 of Figure 1 in the direction of the arrows, Figure 6 is an enlarged sectional view taken along line 6—6 of Figure 5, Figure 7 is an enlarged sectional view taken along line 7—7 of Figure 1, Figure 8 is an enlarged sectional view of a valve structure utilized in the invention, Figure 9 is an enlarged fragmentary elevational view of a portion of the invention, Figure 10 is a sectional view illustrating the interior of the mechanism shown in Figure 9, and Figure 11 is a fragmentary elevational view showing the reverse side of the mechanism disclosed in Figure 9.

Referring more particularly to the drawings, there is shown therein a mattress machine including a framework 10 having mounted thereon a mattress assembly bed 11. Suspended from the upper end of the frame 10 by means of links 12, levers 13, links 14, levers 15 and links 16 is a pair of laterally extending arms 17 adapted to support a hopper 18.

The levers 15 are connected at either end with cross bars 19 from one of which depend a pair of links 16 and laterally extending from the other of which is an arm 20. The levers 13 are interconnected with a laterally extending bar 21 from which depend the other pair of links 16.

A scale beam support 22 depends from the upper portion of the frame 10 and has an integrally formed laterally extending arm 23 upon which is pivotally mounted a scale beam 24 which is interconnected by means of a link 25 with the arm 20 and has its free end protruding through a beam guard 26 carried by a downwardly extending arm 27 affixed at its upper end to the frame 10.

With regard to the links 12, 14 and 16, all are of identical construction comprising a vertical body portion and having both extremities looped, the looped portions being adapted to engage dogs such as those indicated at 28 and which dogs are provided with sharpened contact points whereby greater accuracy may be obtained. The beam 24 is provided with a laterally extending threaded member 29 upon which is threadably mounted a cylindrical shaped weight 30 whereby the beam may be adjusted.

Connected with the top of the hopper 18 by means of cloth sleeves 31 and 32 are supply pipe 33 and a return pipe 34, respectively. The supply pipe is connected to one outlet 35 of a Y-shaped housing which is provided with a second outlet 36 and an inlet 37 connected by means of a pipe 38 to a blower 39 forming a part of a "picker" machine 40. The return pipe 34 is connected in the usual manner, as indicated at 41 to the upper end of the "picker" machine 40.

Suspended from the upper end of the frame 10 by means of a pair of arms 42 is a valve housing 43 having an exhaust valve 44 and an inlet valve 45 mounted in the lower end thereof and having a centrally disposed upwardly extending arm 46 mounted at the top thereof in which is pivotally mounted a lever 47. Valve stems 48 and 49 of valves 45 and 44, respectively, protrude through the top of the housing 43 and are connected to the lever 47. Springs 50 and 51 are interposed between the lever 47 and the housing 43 around the respective stems 48 and 49. The lever 47 is pivotally connected, as indicated at 52, to the upper end of a link 53 which extends vertically through guide members 54 and which is pivotally connected, as indicated at 55, to a lever 56 pivotally connected to the frame 10, as indicated at 57.

The inlet valve is connected by means of a tube 58 to a source of compressed air such as, for example, the tank 59 and the exhaust valve is provided with an opening 60 which allows communication with the outside atmosphere. Tubes 61 connect the interior of the housing 43 to cylinders 62 attached to the side of the hopper 18 by brackets 63 at either end of the hopper. The cylinders are provided with suitable pistons (not shown) which are provided with an outwardly and upwardly extending rod 64 which is pivotally connected, as indicated at 65, at its outer end to a pair of links 66 which, in turn, are pivotally connected, as indicated at 67, to doors 68. The doors 68 are mounted upon hinges 69 carried at the lower end of the hopper 18.

A mercury switch 70 is affixed to the underside of the beam 24 and is connected by suitable wire carried in a cable 71 to a relay housing 72 having mounted therein relays hereinafter to be described and which are adapted to control through suitable wiring a motor 73.

The Y-shaped housing, shown in detail in Figures 9 to 11, inclusive, is provided upon its interior with a pair of gates 74 and 75 pivotally connected at their lower ends upon laterally extending shafts 76 and 77, respectively, which shafts protrude through the Y-shaped housing and carry upon their outer ends arms 78 and 79, respectively. The arms 78 and 79 are adapted to be kept in a parallel condition by means of a link 80 having slots 81 and 82 formed adjacent its extreme ends through which slots protrude, respectively, stub shafts 83 and 84. The link 80 is pivotally connected by means of a pin 85 to a lever 86 pivotally mounted, as indicated at 87 to the housing. The lever 86 is provided at its outer end with a fork 88 within which is slidably engaged a pin 89 carried by a gear 90 which is adapted to enmesh with a drive gear 91 mounted upon a shaft 92 at the other end of which is carried a pulley 93 which is connected by means of a belt 94 to a dual pulley 95 which is, in turn, connected with a pulley 96 by means of a belt 97. The pulley 96 is mounted upon the shaft 98 of the motor 73 which is supported upon a bracket 99 affixed to the lower end of the housing.

A pair of mercury switches 100 and 101 are affixed to one face of the gear 90 in parallel but reverse positions and are connected by suitable wiring and relays whereby to control the direction of operation of the motor.

In practice, the picker 40 (Fig. 1) and the weighing mechanism are approximately 100 feet apart and may be located in separate buildings. It is highly desirable, both from a standpoint of fire hazard and for other safety reasons to operate the control circuits which control the operation of the valve motor 73 at low voltage. For this reason, the motor control circuits are arranged to employ mercury switches, thus avoiding any exposed arc likely to start a fire, and also to use a valve motor of the three phase induction type which has no brushes produces no sparks. With no spark producing contacts in the proximity of the mattress machine, the fire hazard is minimized.

The relays 106 and 107 control two of the three wires of a three-phase power supply circuit, leaving only a single wire connected to the valve motor 73 when both pairs of relays 106 and 107 are deenergized. The valve control motor 73 draws no power under these conditions.

Energization of the pair of relays 106 (Fig. 4) connects two of the three wires of the three-phase supply to valve motor 73 with a polarity such as to cause it to drive gear 90 in a counter-clockwise direction from its mattress-filling position shown in Figure 4 to its by-pass position shown in Figure 9. In the by-pass position of Figure 9, the parts of the by-pass valve are positioned as shown in Figure 10.

Energization of the pair of relays 107 (Fig. 4) connects two of the three wires of the three phase supply to valve motor 73 with the opposite polarity, causing it to run in the opposite direction and drive gear 90 in a clockwise direction from the by-pass position shown in Figure 9 to the mattress-filling position shown in Figure 4.

Starting with the valve in the mattress filling position of Figure 4, the contacts of radially outwardly disposed mercury switch 100 are open, and the contacts of inwardly disposed mercury switch 101 are closed. A circuit extends from the upper end of the secondary winding of step down transformer 108 through the closed contacts of mercury switch 101 and through the winding of a locking relay 102, to the open contacts of scale beam actuated mercury switch 70. The winding of locking relay 102 is shunted by a resistor 104 to decrease the impedance connected in series with the windings of relays 106 and thus to increase the amount of current available for their operation.

When the predetermined weight of mattress filling material has been delivered, scale beam 24 (Fig. 2) is angularly displaced and rotates in a counterclockwise direction as viewed in Figure 3, tilting mercury switch 70 and causing closure of its contacts, which are located at the left hand end of the switch.

Closure of the contacts of mercury switch 70 operates relays 106, the lower ends of their windings being connected in multiple to the lower end of the low voltage secondary winding of transformer 108. The upper ends of the windings of the pair of relays 106 are then connected in multiple through the closed contacts of scale beam mercury switch 70, the winding of locking relay 102, and the closed contacts of mercury switch 101 to complete the circuit to the upper end of secondary winding of step down transformer 108.

Relay 102 operates, closing its normally open contacts and short-circuiting the closed contacts of scale beam mercury switch 70, rendering further operation of the circuit independent of the open or closed condition of the contacts of mercury switch 70, until the next mattress filling operation.

The pair of relays 106 also operates, causing valve motor 73 to drive gear 90 in a counterclockwise direction from the mattress-filling position shown in Figure 4 to the by-pass position shown in Figure 9. This opens the contacts of radially inwardly disposed mercury switch 101 and closes the contacts of the outer switch 100. Opening of the contacts of inner switch 101 releases relays 106 stopping further operation of valve motor 73, and also releases locking relay 102, preparing the circuit for response to the next contact closure of scale beam mercury switch 70.

Closure of the contacts of outer mercury switch 100 prepares a circuit through its closed contacts from upper end of the secondary winding of step down transformer 108 through the winding of a locking relay 103 to the right hand contact of a manually operable push button 109, located in convenient proximity to the mattress filling machine. The locking relay 103 is similar to the locking relay 102, and its operating winding is similarly shunted by a resistor 105.

When the mattress filling machine has been prepared for the filling of the next mattress, the manually operable push button 109 is actuated by the machine operator. This closes the normally open contacts of the push button, and establishes a circuit from the upper end of the low voltage secondary winding of transformer 108 through the closed contacts of mercury switch 100, the winding of locking relay 103 and the two windings of the pair of relays 107 in multiple to the lower end of the secondary winding of transformer 108. Locking relay 103 thereupon operates and closes its normally open contacts, short circuiting the contacts of push button 109 and rendering further circuit operation independent of the push button 109 until the next mattress is ready to be filled.

Operation of relays 107 closes their normally open contacts and connects valve motor 73 to the three-phase supply for operation in a direction which will rotate gear 90 in a clockwise direction from the by-pass position of Figure 9 to the mattress filling position of Figure 4. Clockwise rotation of gear 90 opens outer mercury switch 100 and closes inner mercury switch 101. The opening of outer mercury switch 100 releases the relays 107 and the locking relay 103 stopping further running of valve motor 73 and opening the locking contacts of relay 103 for response to the next operation of push button 109. The closure of inner mercury switch 101 prepares the circuit of relays 107 for response to the next contact closure of scale beam mercury switch 70, as described above.

The relays 102, 103, 106 and 107 are all mounted in the relay housing 72.

In the operation of this apparatus, less space and a fewer number of operators is required than in processes where cotton is blown into bins, then shoveled, mechanically weighed and carried in hampers to the filling machines.

Here the process and operation are comparatively simple. A layer of felt is placed upon the bed 11. The lever 56 is moved upwardly thereby causing the valve 45 to close and the valve 44 to open which, in turn, causes the interiors of the cylinders 62 to return to atmospheric pressure, thus allowing the doors 68 to open due to the weight of cotton thereon. The cotton will thereupon drop downwardly upon the felt where the operators spread the same by hand and then place a second layer of felt thereover and move the thus assembled mass to other machines for finishing operations.

By moving the lever 56 downwardly, the valve 44 will be closed and the valve 45 opened. Air pressure from the tank 59 will now cause the rods 64 to move upwardly in their cylinders 62 and, through the links 66, cause the doors 68 to close. The hopper 18 is now in condition to receive cotton again from the "picker" machine 40 through the pipe 33 and during the course of such loading of the hopper, the excess air thus brought into the hopper is carried off by the pipe 34 to the low pressure side of the picker. A baffle plate 112 depends from the top of the hopper 18 between the connections to the pipes 33 and 34.

The hopper 18 is supported upon a lever type scale which is adapted to move the beam 24 in the conventional manner when a predetermined weight of cotton has been blown into the hopper from the picker 40. This tipping of the beam 24 causes a closing of the mercury switch 70 carried thereon and a circuit is completed to the relay, as indicated at 72 in Figure 1, thereby causing the motor to move, through pulleys 96, 95 and 93 and belts 97 and 94, the shaft 92 which revolves the gears 91 and 90. The pin 89 causes the lever to move to the position shown in Figure 9, thereby causing the arms 78 and 79 to be moved at the same time and revolving the shafts 76 and 77 to cause the gates 75 and 74 to move to the positions shown in Figure 10, whereupon the cotton will be by-passed from entering the pipe 33 and will be passed through the member 36 to a pipe 111 which leads to another hopper assembly (not shown). When the gear 90 has thus revolved a half-turn or 180°, in a counterclockwise direction, as viewed in Figure 9, the switch 100 will be closed and the switch 101 opened thus breaking the circuit to the motor 73, the switches 100 and 101 being so mounted upon the gear as to operate only when the gates are completely opened or closed as the case may be. The opening of the switch 101 at this time causes a break in the circuit including the relays 102 and 106 and the motor 73. To refill the hopper 18 it is only necessary for the operator to press the push button 109 completing a circuit through the switch 100 and the relays 103 and 107 causing the same to reverse the phase rotation of current supplied to and, hence, the direction of rotation of the motor 73, opening the passage to the pipe 35 and thus to the hopper 18 again. In this latter operation the motor will travel in a clockwise direction as viewed, for example, in Figure 9.

While but one form of the invention has been shown and described herein, it will be readily apparent to those skilled in the art that many minor modifications may be made without departing from the spirit of the invention or the scope of the appended claims.

What is claimed is:

An apparatus of the character described comrising a frame, a scale supported by said frame and having a scale arm, a hopper carried by said scale, a picker machine, a feed pipe interconnecting the picker and the hopper and adapted to feed cotton from said picker to said hopper, a valve in said feed pipe, and automatic means for operating the valve to stop the flow of cotton to the hopper when a predetermined weight of cotton has been received therein, said means comprising a switch operable by the movement of the scale arm, a gear connected to and movable with said valve, a reversible electric motor for moving said gear, two individually operable reversing switches for said motor, a pair of reversely gravity operated control switches carried by the gear and each adapted to control an electrical circuit including one of the reversing switches, a push button switch for starting the flow of cotton to the hopper, and electrical circuit including said push button switch, one of said control switches and one of said reversing switches, and an electrical circuit including said switch operable by the scale arm, the other of said control switches and the other of said reversing switches.

JACK L. METCALFE.
THOMAS O. METCALFE.

References Cited in the file of this patent

UNITED STATES PATENTS

| Number | Name | Date |
|---|---|---|
| 1,899,260 | Clements | Feb. 28, 1933 |
| 2,207,407 | Kane | July 9, 1940 |
| 2,412,506 | Greene et al. | Dec. 10, 1946 |